United States Patent

[11] 3,621,378

[72] Inventors  Jury Lvovich Kleiman
                ul. Fontanka, 126, kv. 25;
                Nikolai Viktorovich Morkovin,
                Kiasnoputilovs Kaya, ul. 53, kv. 43; Nikolai
                Ilich Kornilov, Nevsky prospekt, 160, kv.
                16, all of, Leningrad, U.S.S.R.
[21] Appl. No.  819,320
[22] Filed      Apr. 25, 1969
[45] Patented   Nov. 16, 1971
[32] Priority   May 13, 1968
[33]            U.S.S.R.
[31]            1239324

[54] SAMPLE-THERMOSTATTING DEVICE FOR
     RADIO-FREQUENCY SPECTROMETERS
     NOTABLY NMR SPECTROMETERS
     2 Claims, 1 Drawing Fig.
[52] U.S. Cl. .................................................. 324/0.5 R,
                                                        219/498
[51] Int. Cl. ................................................. G01n 27/78
[50] Field of Search .......................................... 324/0.5;
                                                        219/498, 503

[56]              References Cited
              UNITED STATES PATENTS
2,864,995  12/1958  Shoolery ..................... 324/0.5
                OTHER REFERENCES
J. Fenger - A Temperature Regulating System for use with an Electron Spin Resonance Spectrometer - Sci. Instr. - v.42- 1965- pp. 904, 905

Primary Examiner—Michael J. Lynch
Attorney—Waters, Roditi, Schwartz & Nissen

ABSTRACT: A device for thermostating samples in radio-frequency spectrometers including a circuit for comparing voltages corresponding to the preset temperature of thermostatting and the actual temperature of the sample. The comparison circuit produces an error signal proportional to the detected temperature difference which is processed by an electronic controller including a follow-up loop. The follow-up loop is provided with a potentiometer, an amplifier and a motor so interconnected that high accuracy is ensured in controlling the temperature of sample being thermostatted.

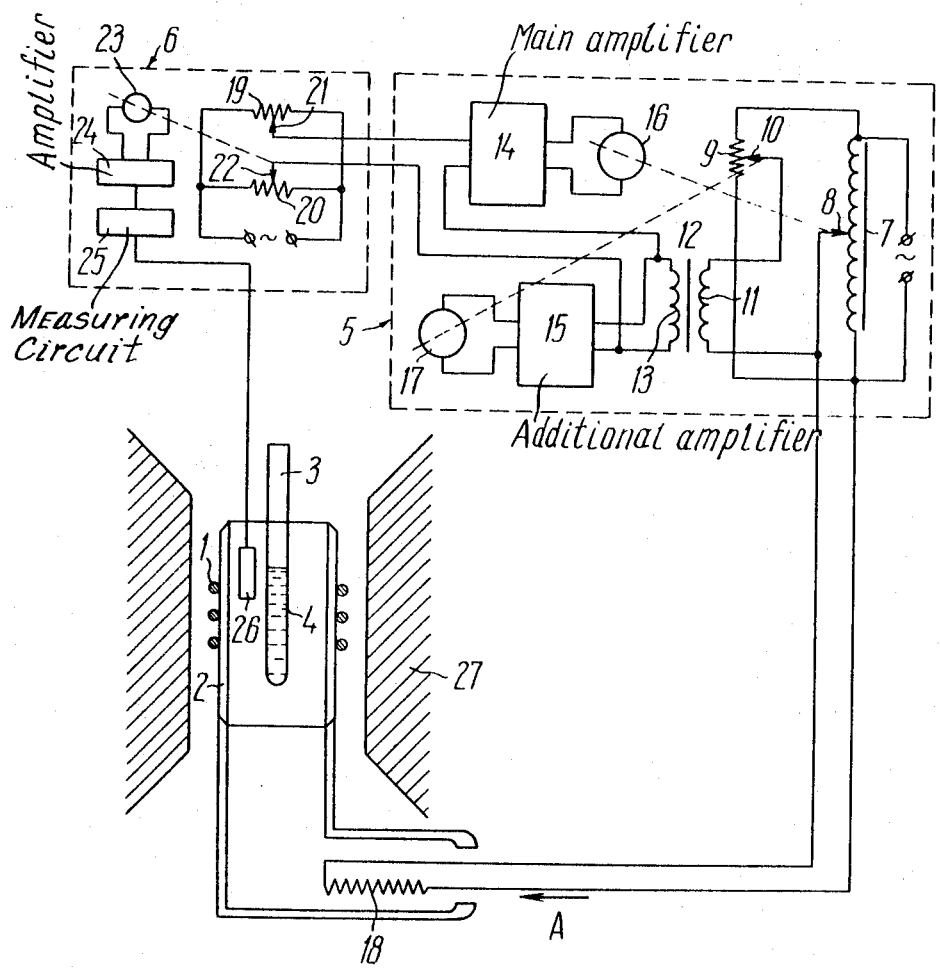

SAMPLE-THERMOSTATTING DEVICE FOR RADIO-FREQUENCY SPECTROMETERS NOTABLY NMR SPECTROMETERS

The present invention relates to radio-frequency spectrometer, and more specifically to sample-thermostatting devices for radio-frequency nuclear-magnetic-resonance (NMR) and electron paramagnetic-resonance (EPR) spectrometers.

There exist devices for thermostatting the sample in radio-frequency spectrometers, notably in NMR spectrometers, in which the thermostatting temperature of the sample is maintained by an electronic controller comprising an autotransformer whose current-pickoff brush is electrically coupled to the primary of a feedback transformer whose secondary is connected through an amplifier to a control motor linked to the current-pickoff brush of the autotransformer to minimize the departure of the actual thermostatting temperature from the desired thermostatting temperature (see, for example, sample-thermostatting devices for radio-frequency spectrometers, notably NMR spectrometers manufactured by the Japan Electron Optics Laboratory Co., Ltd.)

A major disadvantage of such devices is a considerable error in maintaining the thermostatting temperature of the sample.

An object of the present invention is to eliminate this disadvantage.

The objective of the invention is to provide a sample-thermostatting device for radio-frequency spectrometers, notably NMR spectrometers, which can secure a higher accuracy in control of thermostatting temperature.

The present invention consists in a sample-thermostatting device for radio-frequency spectrometers, notably NMR spectrometers, in which the circuit comparing the voltages representing the desired and actual thermostatting temperatures produces an error signal proportional to their difference, and the thermostatting temperature is maintained by an electronic controllers comprising an autotransformer whose current-pickoff brush is electrically connected to the primary of a feedback transformer, whose secondary is connected through an amplifier to a control motor linked to the current-pickoff brush of the autotransformer to minimize the error signal coming from the circuit comparing the voltages representing the desired and actual thermostatting temperatures, in which, according to the invention, the electronic controller comprises a follow-up loop incorporating a potentiometer which is connected in parallel with the autotransformer and whose wiper is electrically connected to the primary of the feedback transformer whose secondary is connected through an additional amplifier to an additional control motor linked to the potentiometer wiper in order to minimize the offset of control action.

This arrangement appreciably improves the quality of temperature investigations of samples.

The invention will be best understood from the following description of a preferred embodiment when read in connection with the accompanying drawing which shows a block diagram of a sample-thermostatting device for radio-frequency spectrometers, according to the invention.

A sample-thermostatting device for radio-frequency spectrometers, notably NMR spectrometers, comprises, according to the invention, a test tube 3 which holds a sample 4, placed inside a Dewar vessel 2 surrounded by a RF-coil 1 of an NMR detector (not shown in the drawing), an electronic thermostatting-temperature controller 5, and an automatic bridge circuit 6.

The electronic controller 5 comprises an autotransformer 7 with a current-pickoff brush 8, in parallel with which is connected a potentiometer 9 with a wiper 10. The brush 8 is connected through a primary 11 of a feedback transformer 12 to the wiper 10. Parallel-connected to a secondary 13 of the transformer 12 are amplifiers 14 and 15 respectively connected to control motors 16 and 17. The control motors 16 and 17 are respectively connected to the brush 8 and the wiper 10 (the kinematic chain is shown by the dashed line in the drawing). The potentiometer 9 with its wiper 10, the amplifier 15 and the motor 17 serve as a follow-up loop in the controller 5. The autotransformer 7 is connected to the supply voltage line. The heater element 18 placed in the Dewar vessel 2 is coupled with slider 8 and one end of the winding of the autotransformer 7.

The bridge circuit 6 comprises two parallel connected potentiometers 19 and 20 with wipers 21 and 22, connected to the input of the electronic controller 5. The wiper 22 is geared to a motor 23 connected through an amplifier 24 and a measuring circuit 25 to a platinum thermometer 26 placed in the Dewar vessel 2 next to the sample 4.

The device disclosed herein operates as follows.

The desired thermostatting temperature of the sample 4 placed in the magnetic field of a magnet 27 is set with the aid of the wiper 21 of the potentiometer 19. The position of the wiper 22 of the potentiometer 20 represents the actual temperature of the sample.

The potential difference between the wipers 21 and 22 of the potentiometers 19 and 20 is taken as the error signal proportional to the difference between the desired and actual thermostatting temperatures of the sample 4. The error signal is amplified by the amplifier 14 and sets the motor 16 in motion. Since each position of the shaft of the motor 16 corresponds to a definite setting of the brush 8 of the autotransformer 7, the heater element 18 is fed with a varying voltage from the output of the autotransformer 7. The voltage across the heater element 18 corresponds to the magnitude of the difference between the desired and actual thermostatting temperatures of the sample 4. The heat-transfer medium, fed in the direction of arrow A, flows around the heater element 18 and transfers heat to the test tube 3 holding the sample 4.

The temperature of the heat-transfer carrier is converted to a voltage by the platinum thermometer 26. The resistance of the latter varies in direct proportion with the temperature. The voltage taken from the thermometer 26 is measured by the measuring circuit 25, amplified by the amplifier 24, and applied to the motor 23. As the position of the shaft in the motor 23 is changed, the setting of the wiper 22 in the potentiometer 20 is also changed, so that it corresponds to the actual temperature of the sample 4.

The error signal applied to the input of the amplifier 14 causes the brush 8 on the autotransformer 7 to move until the feedback signal conveyed to the input of the amplifier 14 through the feedback transformer 12 balances out the error signal. As the actual temperature of the sample 4 approaches the set point, the error signal and the feedback signal decrease simultaneously, and so does the voltage applied to the heater element 18.

At some voltage across the heater element 18, a state of balance is obtained, and the magnitude of the feedback signal corresponding to the state of balance represents the error signal at the input of the amplifier 14.

The per cent ratio between the error voltage and the supply voltage of the potentiometer gives the error of the controller 5. The greater the feedback factor, the greater this steady state error, or offset, but the stability of the controller 5 is enhanced. Conversely, as the steady state error (the feedback factor) is decreased, the stability of the controller 5 is impaired, and there may be even the danger of self-oscillations.

The steady-state error (offset) of the controller is eliminated without impairment to its stability by the follow-up loop which feeds the signal taken from the secondary of the feedback transformer 12 and amplified by the amplifier 15, to the motor 17.

Upon arrival of this signal, the shaft of the motor 17 is rotated, thereby changing the position of the wiper 10 on the potentiometer 9 until the feedback transformer 12 is deenergized completely.

In operation with the follow-up loop, the steady state error (offset) of the electronic controller is equal to the dead-band of that loop and is negligibly small.

Thus, the invention disclosed herein provides for the elimination of the steady state error (offset) in setting the sample temperature and, consequently, materially improves the accuracy with which this temperature is controlled.

What is claimed is:

1. A sample-thermostatting device for radio-frequency NMR spectrometers, comprising: a thermostatted enclosure adapted for insertion in a spectrometer; a sample placed in said thermostatted enclosure; voltage means for producing two voltages representing respectively the desired and actual sample-thermostatting temperatures, a circuit comparing the voltages representing the desired and actual sample-thermostatting temperatures and producing an error signal proportional to their difference; said error signal being supplied across two leads; an electronic controller to control the thermostatting temperature of the sample comprising: a source of supply voltage an auto transformer connected across said source of supply voltage and having a current-pickoff brush; a feedback transformer, one end of the primary of said feedback transformer being electrically connected to said current-pickoff brush of said autotransformer; a main amplifier having one input connected to one end of the secondary of said feedback transformer; the other end of said secondary being connected to one of said two leads; said main amplifier having a second input connected to the other of said two leads a main control motor electrically connected to the output of said main amplifier and linked to said current-pickoff brush of said autotransformer to minimize the error signal proportional to the difference between the desired and actual thermostatting temperatures of the sample; a follow-up loop in said electronic controller; a potentiometer, said potentiometer included in said follow-up loop and being parallel connected to said autotransformer and having a wiper electrically connected to the other end of the primary of said feedback transformer; an additional amplifier having the inputs thereof connected across the secondary of said feedback transformer; an additional control motor electrically connected to the output of said additional amplifier and geared to said wiper of said potentiometer to minimize the steady state errors of said electronic controller; and means for heating the sample connected between one end of said autotransformer and said current pickoff brush.

2. A sample-thermostatting device as set forth in claim 1, wherein said circuit comparing the voltages comprises first and second potentiometers having first and second wiper arms respectively, each of said first and second wiper arms being connected to a respective one of said two leads, a measuring circuit producing an output proportional to the actual sample temperature, a motor connected to said measuring circuit and being responsive thereto, said motor being mechanically connected to said second wiper arm, said desired thermostatting temperature being set by said first wiper arm.

* * * * *